US012689938B2

(12) United States Patent
Yousuf et al.

(10) Patent No.: US 12,689,938 B2
(45) Date of Patent: Jul. 21, 2026

(54) WIRELESS COMMUNICATION SYSTEM AND SERVICE FLOW CONTROL

(71) Applicant: Charter Communications Operating, LLC, St. Louis, MO (US)

(72) Inventors: Kamran Yousuf, Centennial, CO (US); Faisal Khan, Aurora, CO (US); Ramneek S. Bali, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 71 days.

(21) Appl. No.: 18/623,174

(22) Filed: Apr. 1, 2024

(65) Prior Publication Data

US 2025/0310821 A1    Oct. 2, 2025

(51) Int. Cl.
*H04W 28/02* (2009.01)
*H04L 49/90* (2022.01)

(52) U.S. Cl.
CPC ......... *H04W 28/0268* (2013.01); *H04L 49/90* (2013.01)

(58) Field of Classification Search
None
See application file for complete search history.

(56) References Cited

U.S. PATENT DOCUMENTS

| | | | | |
|---|---|---|---|---|
| 2018/0145746 A1* | 5/2018 | Finkelstein | .......... | H04B 7/2612 |
| 2019/0274064 A1* | 9/2019 | Chapman | .......... | H04W 28/0268 |
| 2019/0387539 A1* | 12/2019 | Finkelstein | .......... | H04W 72/23 |
| 2022/0060346 A1* | 2/2022 | Sevindik | .......... | H04L 12/2801 |
| 2022/0141844 A1* | 5/2022 | Sevindik | .......... | H04L 61/5007 |
| | | | | 370/329 |
| 2022/0182338 A1* | 6/2022 | Hoole | .......... | H04W 40/12 |
| 2024/0155413 A1* | 5/2024 | Burke | .......... | H04W 28/0268 |
| 2025/0097717 A1* | 3/2025 | Narayanan Nair | .......... | |
| | | | | H04Q 11/0062 |

* cited by examiner

*Primary Examiner* — June Sison
(74) *Attorney, Agent, or Firm* — Armis IP Law, LLC

(57) ABSTRACT

A system as discussed herein includes communication management hardware. The communication management hardware: receives a first data packet including a first data payload, the first data packet encoded in accordance with a wireless communication protocol for conveyance to a destination network address; maps a first quality of service associated with the first data packet to a first service flow amongst multiple service flows supported by a backhaul network; and forwards the first data packet over the first service flow of the backhaul network for delivery of the first data packet to the destination network address.

26 Claims, 9 Drawing Sheets

MAP INFO
150

| DATA TYPE (TAG VALUES) | SERVICE FLOW | QUEUE |
|---|---|---|
| A1, A2, A3, … | SF1 | Q11 |
| B1, B2, B3, … | SF2 | Q12 |
| C1, C2, C3, … | SF3 | Q13 |
| … | … | … |

FIG. 2

MAP INFO 151

| TAG VALUE | RESOURCE TYPE | DEFAULT PRIORITY LEVEL | PACKET DELAY BUDGET |
|---|---|---|---|
| A1 (5QIV=1) | GBR | 20 | 100MS |
| A2 (5QIV=2) | GBR | 40 | 150MS |
| A3 (5QIV=3) | GBR | 30 | 50MS |
| ... | ... | ... | ... |
| B1 (5QIV=5) | NON-GBR | 10 | 100MS |
| B2 (5QIV=6) | NON-GBR | 60 | 300MS |
| B3 (5QIV=7) | NON-GBR | 70 | 100MS |
| ... | ... | ... | ... |
| C1 (5QIV=82) | D.C. GBR | 19 | 10MS |
| C2 (5QIV=83) | D.C. GBR | 22 | 30MS |
| C3 (5QIV=84) | D.C. GBR | 24 | 30MS |
| ... | ... | ... | ... |

FIG. 3

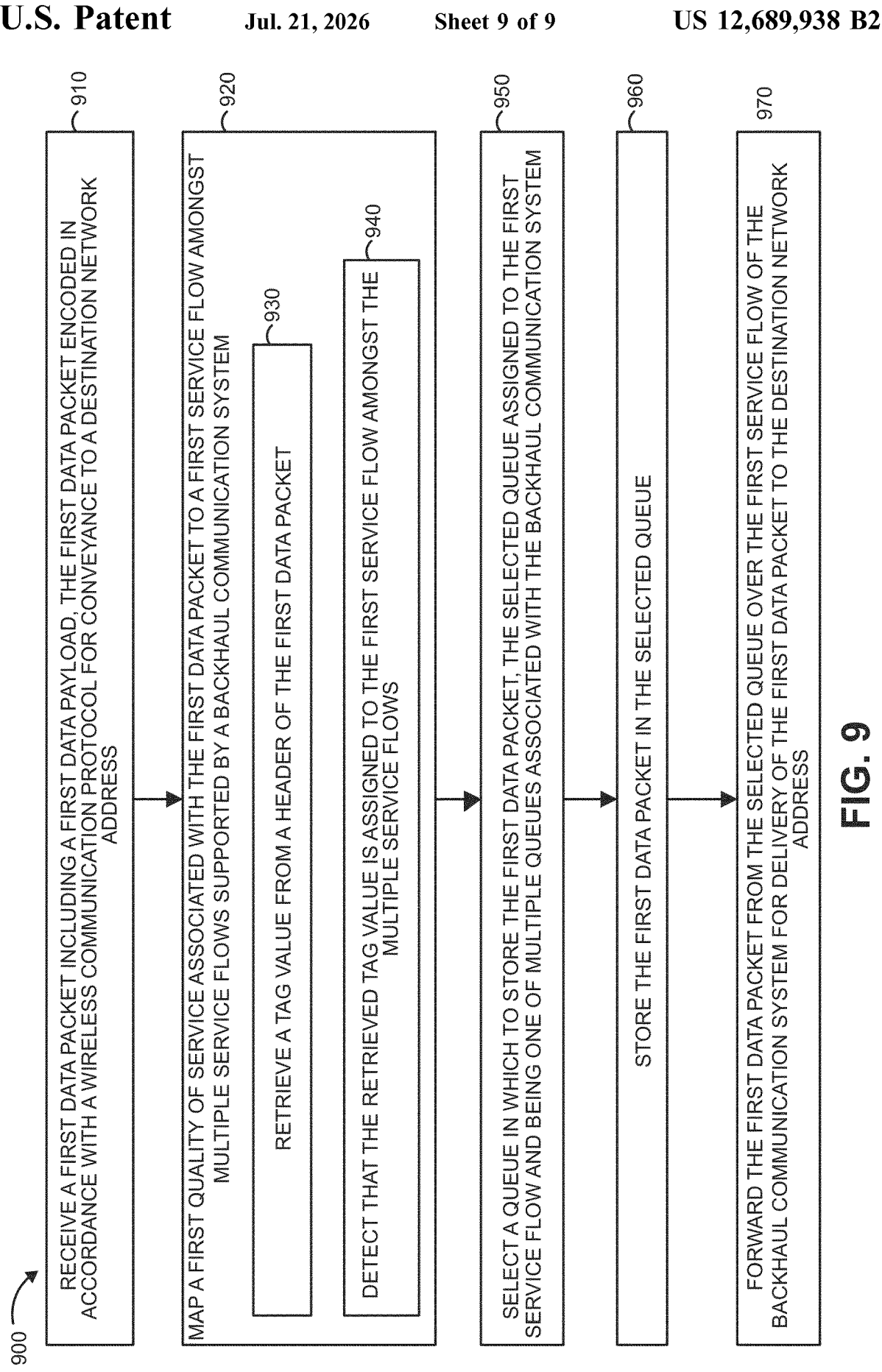

910 — RECEIVE A FIRST DATA PACKET INCLUDING A FIRST DATA PAYLOAD, THE FIRST DATA PACKET ENCODED IN ACCORDANCE WITH A WIRELESS COMMUNICATION PROTOCOL FOR CONVEYANCE TO A DESTINATION NETWORK ADDRESS

920 — MAP A FIRST QUALITY OF SERVICE ASSOCIATED WITH THE FIRST DATA PACKET TO A FIRST SERVICE FLOW AMONGST MULTIPLE SERVICE FLOWS SUPPORTED BY A BACKHAUL COMMUNICATION SYSTEM

930 — RETRIEVE A TAG VALUE FROM A HEADER OF THE FIRST DATA PACKET

940 — DETECT THAT THE RETRIEVED TAG VALUE IS ASSIGNED TO THE FIRST SERVICE FLOW AMONGST THE MULTIPLE SERVICE FLOWS

950 — SELECT A QUEUE IN WHICH TO STORE THE FIRST DATA PACKET, THE SELECTED QUEUE ASSIGNED TO THE FIRST SERVICE FLOW AND BEING ONE OF MULTIPLE QUEUES ASSOCIATED WITH THE BACKHAUL COMMUNICATION SYSTEM

960 — STORE THE FIRST DATA PACKET IN THE SELECTED QUEUE

970 — FORWARD THE FIRST DATA PACKET FROM THE SELECTED QUEUE OVER THE FIRST SERVICE FLOW OF THE BACKHAUL COMMUNICATION SYSTEM FOR DELIVERY OF THE FIRST DATA PACKET TO THE DESTINATION NETWORK ADDRESS

WIRELESS COMMUNICATION SYSTEM AND SERVICE FLOW CONTROL

BACKGROUND

Conventional wireless networks typically include one or more wireless base stations or wireless access points to provide mobile communication devices (a.k.a., user equipment) access to a remote network such as the Internet or other target communication devices and remote locations. In certain instances, the wireless networks include many different types of networks and/or components that must collectively work together to provide wireless services.

One conventional type of wireless network is a 5G wireless network. A 5G wireless network typically includes at least one so-called 5G radio access network (RANs) and corresponding 5G core network. A conventional 5G wireless base station may be connected to a 5G core network via an IP network commonly referred to as a backhaul. 5G networks implement dynamic policy to enforce behaviors on user traffic.

Another type of conventional communication system is a cable modem system. A significant portion of Internet service plans provide Internet connectivity to subscriber domains through a conventional cable modem system. Such Internet connectivity is often provided by a cable TV service provider. It is common for such cable-based Internet service to be provided along with conventional cable television service. For example, a single coaxial cable or fiber simultaneously delivers both signals for conventional cable TV service as well as Internet data to a customer location (such as a residential house). At the customer premises, the cable communication link is typically split so that the conventional cable television service is transmitted to one or more set top boxes connected to one or more televisions, while the Internet data follows a separate line to a cable modem. The cable modem can then provide Internet connectivity (wireless or physical connectivity) to multiple devices such as desktop computer, Voice-over-IP telephones, laptop computers, cellular telephones, tablet computers, etc.

BRIEF DESCRIPTION

Techniques as discussed herein provide improved conveyance of data packets encoded in accordance with one or more wireless communication protocols.

For example, a communication management resource as discussed herein receives a first data packet including a first data payload; the first data packet is encoded in accordance with a wireless communication protocol for conveyance to a destination network address. The communication management resource determines a first quality of service associated with the first data packet and maps the first quality of service associated with the first data packet to a first service flow amongst multiple service flows supported by a backhaul network. Further, the communication management resource forwards the first data packet over the first service flow of the backhaul network for delivery of the first data packet to the destination network address. The backhaul network forwards the first data packet in accordance with the first quality of service assigned to the first data packet.

In one example, the backhaul network includes a cable modem system. The multiple service flows support conveyance of different types of data traffic between a cable modem of the cable modem system and a cable modem termination node of the cable modem system.

In a further example, the first quality of service associated with or assigned to the first data packet is one of multiple qualities of service supported by the wireless communication protocol.

In still further examples as discussed herein, the communication management resource can be configured to map the first quality of service associated with the first data packet to the first service flow in any suitable manner. For example, the communication management resource can be configured to retrieve a tag value from the first data packet. The tag value indicates a first quality of service to which the first data packet pertains. Mapping of the first quality of service associated with the first data packet to the first service flow amongst multiple service flows may include: assigning the first data packet for transmission over the first service flow in response to detecting that the first service as specified by the tag value falls within a first group of multiple services assigned to the first service flow. In one example, the originally received tag value from the first data packet indicates how to allocate network resources to convey the first data packet over the backhaul communication network.

Note that the tag value associated with the first data packet can be obtained in any suitable manner. In one example, the communication management resource retrieves the tag value from a header of the first data packet.

Still further, examples herein include the communication management resource selecting a first queue amongst multiple queues in which to store the first data packet. The selected queue may be one of multiple queues associated with the backhaul network. The communication management resource stores the first data packet in the selected queue (first queue).

As further discussed herein, the queue selected for forwarding the received first data packet may be any one of multiple queues such as: i) a first bit rate service flow queue providing a first transmission bit rate greater than a minimum bit rate value, the first transmission bit rate being guaranteed, ii) a second bit rate service flow queue providing a second transmission bit rate, the second transmission bit rate being non-guaranteed, and iii) a third bit rate service flow queue supporting latency below a latency threshold level.

Techniques as discussed herein are useful over conventional techniques. For example, one or more implementation of a communication management resource and corresponding operations as discussed herein provide better use of a respective communication system to convey data packets encoded in accordance with a wireless communication protocol.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including a non-transitory computer-readable storage medium or any computer readable hardware storage medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium or computer readable hardware storage such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to a method, system, computer program product, etc., that supports operations as discussed herein.

One example includes computer readable storage hardware having instructions stored thereon. The instructions, when executed by corresponding computer processor hardware, cause the computer processor hardware (such as one or more co-located or disparately processor devices or hardware) to: receive a first data packet including a first data payload, the first data packet encoded in accordance with a wireless communication protocol for conveyance to a destination network address; map a first quality of service associated with the first data packet to a first service flow amongst multiple service flows supported by a backhaul network; and forward the first data packet over the first service flow of the backhaul network for delivery of the first data packet to the destination network address.

The ordering of the steps above has been added for clarity sake. Note that any of the processing steps as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling conveyance of data packets via service flows in a network environment. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

BRIEF DESCRIPTION OF THE DRAWINGS

FIG. 2 is an example diagram illustrating map information supporting data packet flow control as discussed herein.

FIG. 3 is an example diagram illustrating map information of different kinds of data packets and corresponding delivery attributes as discussed herein.

FIG. 9 is an example diagram illustrating a method as discussed herein.

Figure 1:
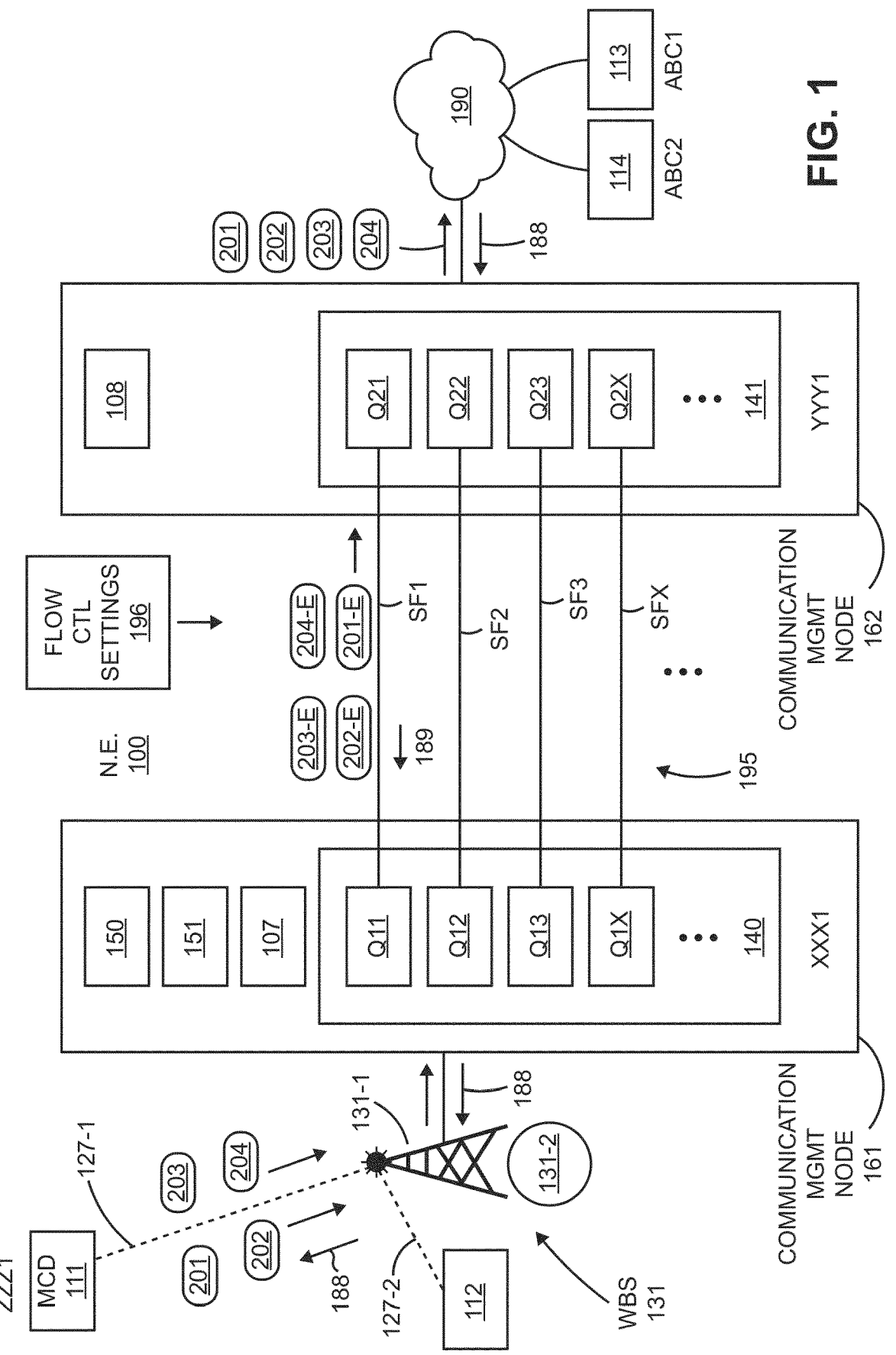
FIG. 1 is an example diagram illustrating a network environment implementing data packet processing and flow control as discussed herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

Now, more specifically, with reference to the drawings, FIG. 1 is an example diagram illustrating a network environment implementing data packet flow control/management as discussed herein.

As shown in FIG. 1, the network environment 100 includes mobile communication device 111 (assigned unique identifier value ZZZ1), mobile communication device 112 (such as assigned unique identifier value ZZZ2), . . . , wireless base station 131, communication management node 161 (assigned unique identifier value XXX1), network 195, communication management node 162 (assigned unique identifier value YYY1), network 190 (such as one or more networks of any type), communication device 113 (assigned unique identifier value ABC1), and communication device 114 (assigned unique identifier value ABC2).

The mobile communication device 111 establishes a wireless communication link 127-1 with the wireless base station 131. Additionally, the mobile communication device 112 establishes the wireless communication link 127-2 with the wireless base station 131.

Via the wireless communication link 127-1, the mobile communication device 111 wirelessly transmits the communications 201, 202, 203, 204, etc., to the wireless base station 131. The wireless base station 131 forwards these communications to the communication management node 161 and corresponding communication management resource 140 for further transmission to the appropriate destination in the network environment 100.

In one example, the assigned unique identifier values are network addresses assigned to the different entities. The network addresses enable conveyance of corresponding data from a source node to a respective target node.

Note that each of the resources as discussed herein can be implemented via hardware, software, or a combination of hardware and software. For example, the communication management resource 140 can be implemented as communication management hardware, communication management software, or a combination of communication manager hardware and communication management software; the wireless base station 131 can be configured as wireless base station hardware, wireless base station software, or a combination of wireless base station hardware and wireless base station software; mobile communication device 111 can be configured as mobile communication device hardware, mobile communication device software, or a combination of mobile communication device hardware mobile device software; communication management node 161 can be configured as communication management hardware, communication management software, or a combination of communication management hardware and communication management software; network 195 can be configured as network hardware, network software, or a combination of network hardware and network soft; communication management resource 141 can be configured as communication management hardware, communication management software, or combination of communication manager hardware and communication management software; communication management node 162 can be configured as communication management hardware, communication management software, or a combination of communication manager hardware and communication management software; communication management resource 141 can be configured as communication management hardware, communication management software, or a combination of communication management hardware and communication management software; and so on.

In one example, the communication management node 161 is a so-called cable modem. The communication management node 162 is a so-called cable modem termination system (a.k.a., cable modem termination node). The network 195 such as a backhaul network can be configured as hybrid fiber-coaxial (HFC) infrastructure or other suitable one or more entities supporting conveyance of communications between the communication management node 161 and the communication management node 162.

Note further that a combination of the communication management node 161, network 195, and the communication management node 162 can be configured to support conveyance of bidirectional communications over the respective service flows in accordance with DOCSIS (Data Over Cable Service Interface Specifications) protocol or any other suitable communication protocol. Note that DOCSIS is an international telecommunications standard that supports the addition of high-bandwidth data transfer to an existing cable television (CATV) system. The DOCSIS protocol may be used by the communication management notes 161 and 162 to provide controlled conveyance of data packets over their existing hybrid fiber-coaxial (HFC) infrastructure.

As further discussed herein, a conventional cable modem communication system (including the communication management node 161, network 195, and the communication management node 162) may be modified to support conveyance of wireless communications conveyed over the wireless communication link 127-1.

As further shown, the wireless base station 131 includes tower and antenna hardware (131-1) as well as gNodeB equipment 131-2 including one or more components such as a Central Unit (CU), a Distribution Unit (DU), and a Radio Unit (RU). As previously discussed, the wireless base station 131 supports wireless connectivity with each of the mobile communication devices 111, 112, etc., as well as provides connectivity to the communication management node 161.

In this example, the communication management node 161 includes the communication management resource 141 and corresponding queues Q1X, Q11, Q12, and Q13. As discussed herein, the queues are used as a basis in which to temporarily store data packets for subsequent transmission over different service flows of the network 195.

As further shown in FIG. 1, the communication management node 161 includes or has access to the map information 150 stored in the repository 180. An example of the map information 150 and map information 151 as shown in FIG. 2.

In general, the map information 150 in FIG. 2 illustrates a mapping of multiple tag values to a respective service flow of network 195.

In this example, each of the communications 201, 202, 203, 204, etc., conveyed over the wireless communication link 127-1 from the mobile communication device 111 to the wireless base station 131 includes a respective tag value such as available from a group of tag values including tag value A1, tag value A2, tag value A3, . . . , tag value B1, tag value B2, tag value B3, . . . , tag value C1, tag value C2, tag value C3, etc.

A tag value in each respective communication indicates a corresponding level of quality or quality of service to be provided to the communication when transmitted over the respective network 195.

More specifically, the map information 150 in this example indicates that communications marked with any of the group A tag values A1, A2, A3, etc., are to be transmitted over the service flow SF1 of the network 195 via storage in the queue Q11; the map information 150 indicates that communications marked with any of the group B tag values B1, B2, B3, etc., are to be transmitted over the service flow SF2 of the network 195 via storage in the queue Q12; the map information 150 indicates that communications marked with any of the group C tag values C1, C2, C3, etc., are to be transmitted over the service flow SF3 via storage in the queue Q13; and so on.

The network 195 can be configured to include any number of service flows. The queue Q1X can be configured to store communications that are not marked with any of the above mentioned tag values associated with group A, group B, or group C.

As further discussed below, prior to storage of a respective received communication into a corresponding queue, the communication management resource 140 encapsulates the respective received communication for delivery over the network 195. The queue Q11 can be a first bit rate service flow queue providing a first transmission bit rate greater than a minimum bit rate value, the first transmission bit rate being guaranteed; the queue Q12 can be a second bit rate service flow queue providing a second transmission bit rate, the second transmission bit rate being non-guaranteed; the queue Q13 can be a third bit rate service flow queue supporting latency below a latency threshold level.

FIG. 3 is an example diagram illustrating map information of different kinds of data packets and corresponding delivery attributes as discussed herein.

In this example, the tag value A1 such as (5QI value=1, where 5QI=5G Quality of Service Identifier) received in a wireless communication is assigned a resource type GBR (Guaranteed Bandwidth Rate), a default priority level of 20, packet delay budget of 100 milliseconds, packet error rate of $10^{-2}$, default averaging window of 2000 milliseconds, service type of conversational voice; the tag value A2 such as (5QI value=2) received in a wireless communication is assigned a resource type GBR (Guaranteed Bandwidth Rate), a default priority level of 40, packet delay budget of 150 milliseconds, packet error rate of $10^{-3}$, default averaging window of 2000 milliseconds, service type of conversational video such as live streaming; the tag value A3 such as (5QI value=3) received in a wireless communication is assigned a resource type GBR (Guaranteed Bandwidth Rate), a default priority level of 30, packet delay budget of 50 milliseconds, packet error rate of $10^{-3}$, default averaging window of 2000 milliseconds, service type of real-time gaming; etc.

Further in this example, the tag value B1 such as (5QI value=5) received in a wireless communication is assigned a resource type non-GBR (non-Guaranteed Bandwidth Rate), a default priority level of 10, packet delay budget of 100 milliseconds, packet error rate of $10^{-6}$, service type of IMS (IP Multimedia Subsystem or IP Multimedia Core Network Subsystem) signaling; the tag value B2 such as (5QI value=6) received in a wireless communication is assigned a resource type non-GBR (non-Guaranteed Bandwidth Rate), a default priority level of 60, packet delay budget of 300 milliseconds, packet error rate of $10^{-6}$, service type of video buffered streaming such as TCP-based; the tag value B3 such as (5QI value=7) received in a wireless communication is assigned a resource type non-GBR (non-Guaranteed Bandwidth Rate), a default priority level of 70, packet delay budget of 100 milliseconds, packet error rate of $10^{-3}$, service type of voice, video interactive gaming; etc.

Further in this example, the tag value C1 such as (5QI value=82) received in a wireless communication is assigned a resource type delay critical GBR (delay critical Guaranteed Bandwidth Rate), a default priority level of 19, packet delay budget of 10 milliseconds, packet error rate of $10^{-4}$, default averaging window of 2000 milliseconds, service type of discrete automation; the tag value C2 such as (5QI value=83) received in a wireless communication is assigned a resource type delay critical GBR (delay critical Guaranteed Bandwidth Rate), a default priority level of 22, packet delay budget of 10 milliseconds, packet error rate of $10^{-4}$, default averaging window of 2000 milliseconds, service type of discrete automation, V2x messages; the tag value C3 such as (5QI value=84) received in a wireless communication is assigned a resource type delay critical GBR (delay critical Guaranteed Bandwidth Rate), a default priority level of 24, packet delay budget of 30 milliseconds, packet error rate of $10^{-5}$, service type of intelligent transport systems; etc.

Note that the different tagged communications can be grouped for storage in a respective queue. For example, any wireless communications including tag values in a first group including A1, A2, A3, etc., can be assigned for storage in queue Q11 for subsequent delivery over the network 195 to a destination; any wireless communications including tag values in a second group including B1, B2, B3, etc., can be assigned for storage in queue Q12 for subsequent delivery over the network 195 to a destination; any wireless communications including tag values in a third group including C1, C2, C3, etc., can be assigned for storage in queue Q13 for subsequent delivery over the network 195 to a destination; and so on.

Referring again to FIG. 1, the communication management resource 140 associated with the communication management node 161 can be configured to use the map information 150 and the forwarding control information 107 as a basis in which to process and encapsulate the received communications 201, 202, 203, etc., and subsequently store those encapsulated communications (encapsulated data packets) in the corresponding queues of communication management node 161 for controlled transmission of the one or more encapsulated communications over the different service flows of the network 195.

Note that the communication management resource 140 retrieves a tag value from each received data packet (communications 201, 202, 203, etc.) to determine a respective quality of service assigned to the data packet. The retrieved tag value can be configured to indicate how to allocate network resources in the network 195 to convey the data packet over the backhaul communication network.

In one example, the flow control settings 196 assigned to the network 195 (such as a backhaul network) are used as a basis in which to control conveyance of the encapsulated communications received from the communication management node 161 over the different service flows such as service flow SFx, service flow SF1, service flow SF2, service flow SF3, service flow SF4, and so on.

Each of the different service flows associated with the network 195 and flow control settings 196 supports a different quality of service level.

For example, the highest priority data packets (first level priority communications) stored in the queue Q11 (such as communications tagged with any of the tag values A1, A2, A3, etc.) are conveyed over the service flow SF1 in accordance with a first level of quality (first quality of service); the next highest priority data packets (second level priority communications) stored in the queue Q12 (such as communications tagged with any of the tag values B1, B2, B3, etc.) are conveyed over the service flow SF2 in accordance with a second level of quality (second quality of service); the next highest priority data packets (third level priority communications) stored in the queue Q13 (such as communications tagged with any of the tag values C1, C2, C3, etc.) are conveyed over the service flow SF3 in accordance with a third level of quality (third quality of service); and so on.

Communication management node 161 further includes data packet forwarding control information 107 for use by the communication management resource 140 to schedule and transmit communications stored in the queues QX1, Q11, Q12, and Q13 over the network 195 (such as a backhaul network) to the communication management node 162.

In accordance with the data packet forwarding control information 107, note further that the first quality of service associated with the service flow SF1 can be configured to provide conveyance of encapsulated communications over the network 190 with a latency of transmission between the communication management node 161 and the communication management node 162 below a first latency threshold level and/or greater than a first bit rate threshold level; the second quality of service associated with the service flow SF2 can be configured to provide conveyance over the network 190 with a latency of transmission between the communication management node 161 and the communication management node 162 below a second latency threshold level and/or greater than a second bit rate threshold level; the third quality of service associated with the service flow SF3 can be configured to provide conveyance over the network 190 with a latency of transmission between the communication management node 161 and the communication management node 162 below a third latency threshold level and/or greater than a third bit rate threshold level; and so on.

In one example, the communication management resource 140 is configured to transmit the encapsulated communications stored in the queue Q1X over the service flow SFx such as allocated to convey conventional communications between a cable modem and a cable modem termination system. Accordingly, the multiple different service flows SF1, SF2, SF3, as discussed herein provide a so-called bypass path (with respect to the conventional service flow SFx) in which to communicate the data packets 201, 202, 203, 204, etc., and corresponding data payloads from the communication management node 161 are conveyed over the network 195 to the communication management node 162. Thus, the service flows SF1, SF2, and SF3 provide a supplemental or bypass capability with respect to the service flow SFX for communication of data packets from the communication management node 161 to the communication management node 162. The bypass service flows SF1, SF2, and SF3 for conveying data packets received in wireless communications support different levels of quality as previously discussed.

Thus, as further discussed herein, the communication system including communication management node 161, network 195, and the communication management node 162, can be configured to support the bypass service flows SF1, SF2, and SF3 for conveyance of a respective communications received over the wireless communication links 127. The following FIGS. 4-7 illustrate encapsulation of the received communications for conveyance over the network 195 discussed herein.

Figure 4:
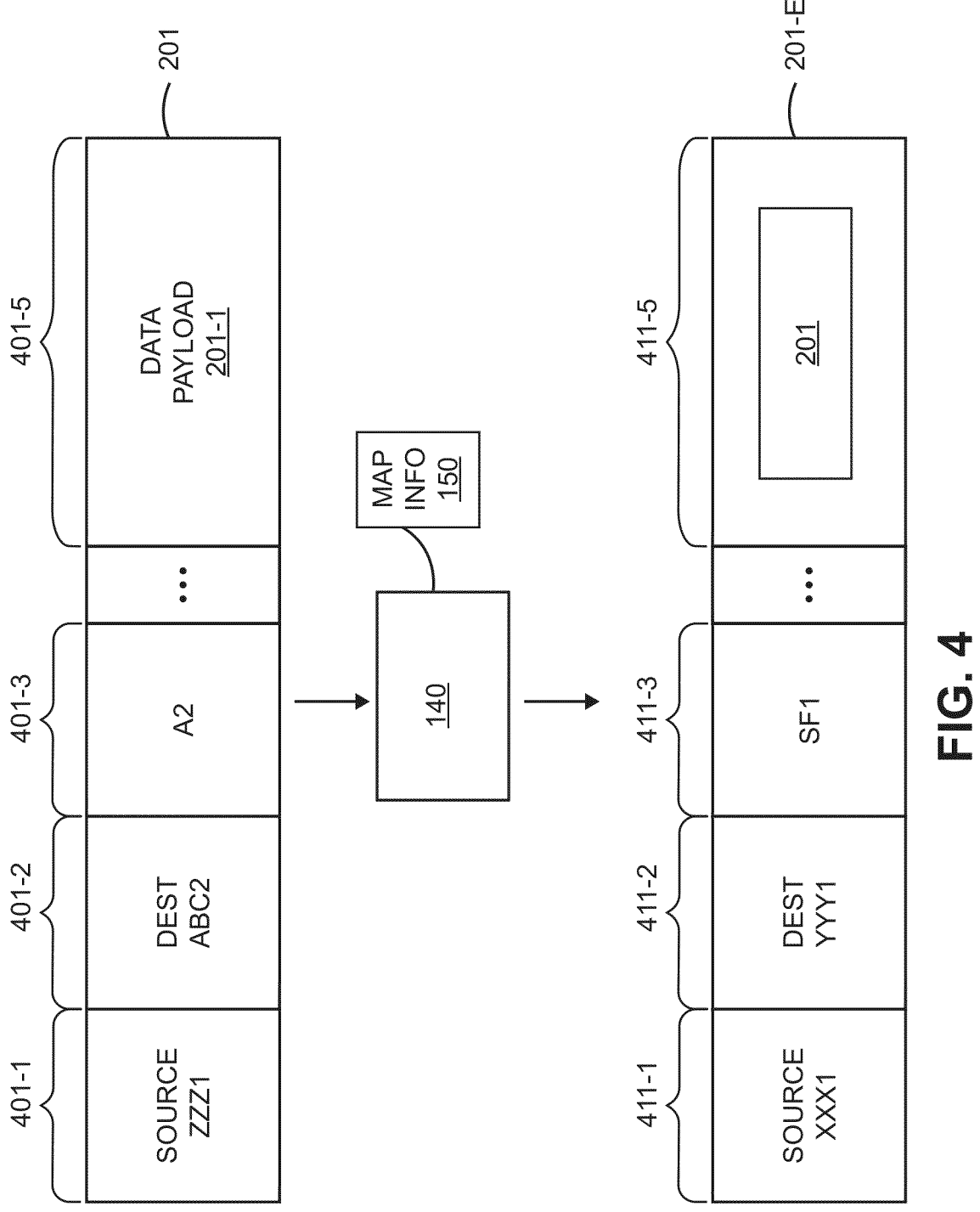
FIG. 4 is an example diagram illustrating conversion of a respective first data packet encoded in accordance with a wireless communication protocol into a first encapsulated data packet for conveyance over a first service flow of a backhaul network as discussed herein.

FIG. 4 is an example diagram illustrating conversion of a respective first data packet encoded in accordance with a wireless communication protocol into a first encapsulated data packet for conveyance over a first service flow of a backhaul network as discussed herein.

In this example, the communications 201 conveyed from the mobile communication device 111 over the wireless communication link 127-1 to the wireless base station 131 include: i) a source network address of ZZZ1 in data field 401-1, ii) destination network address of ABC2 in data field 401-2, iii) tag value of A2 in data field 401-3, . . . , and iv) data payload of 201-1 in data field 401-5.

Note that the data fields 401-1, 401-2, and 401-3 are present in a respective routing header of the communications 201 (such as a data packet).

The source network address of ZZZ1 in data field 401-1 indicates the identity of the mobile communication device 111 transmitting the communications 201. The destination network address of ABC2 indicates an identity of a communication device 114 to which the communications 201 are being transmitted for delivery. The tag value A2 in data field 401-3 indicates a corresponding type of quality of service in which to forward the communications 201 to the target communication device 114.

As further shown, the communication management resource 140 utilizes the map information 150 as a basis in which to prepare (convert) the communications 201 for transmission over the network 195.

For example, the communication management resource 140 receives communications 201 (such as a first data packet) including a first data payload 201-1. In one example, the communications 201 are encoded in accordance with a wireless communication protocol for conveyance to a destination network address ABC2 as previously discussed. The communication management resource 140 uses the map information 150 to determine a corresponding service flow in which to convey the received communications 201. As previously discussed, the map information 150 indicates that tag values A1, A2, A3, etc., map to the service flow SF1 and corresponding queue Q11. This mapping can include the communication management resource 140 retrieving the tag value A2 from the data field 401-3 and, via the map information 150, detecting that the tag value A2 corresponds to the service flow SF1 and the queue Q11. In such an instance, the communication management resource 140 maps a first quality of service as indicated by the tag value A2 to the service flow SF1 amongst multiple service flows (SF1, SF2, SF3, SFx) supported by the network 195 such as a backhaul communication system.

As further shown, to produce the encapsulated communication 201-E, the communication management resource 140 populates the data field 411-1 of the encapsulated communication 201-E to include a source network address of XXX1 (unique identifier value) assigned to the communication management node 161; the communication management resource 140 populates the data field 411-2 of the encapsulated communications 201-E to include a destination network address of YYY1 assigned to the communication management node 162; the communication management resource 140 stores flow control information such as one or more of tag value SF1 indicating the service flow SF1, tag value A2, etc., in the data field 411-3; the communication management resource 140 stores the original communications 201 in the data field 411-5 of the communications 201-E.

The communication management resource 140 then stores the encapsulated communications 201-E in the identified queue Q11 for subsequent delivery over the service flow SF1.

Figure 5:
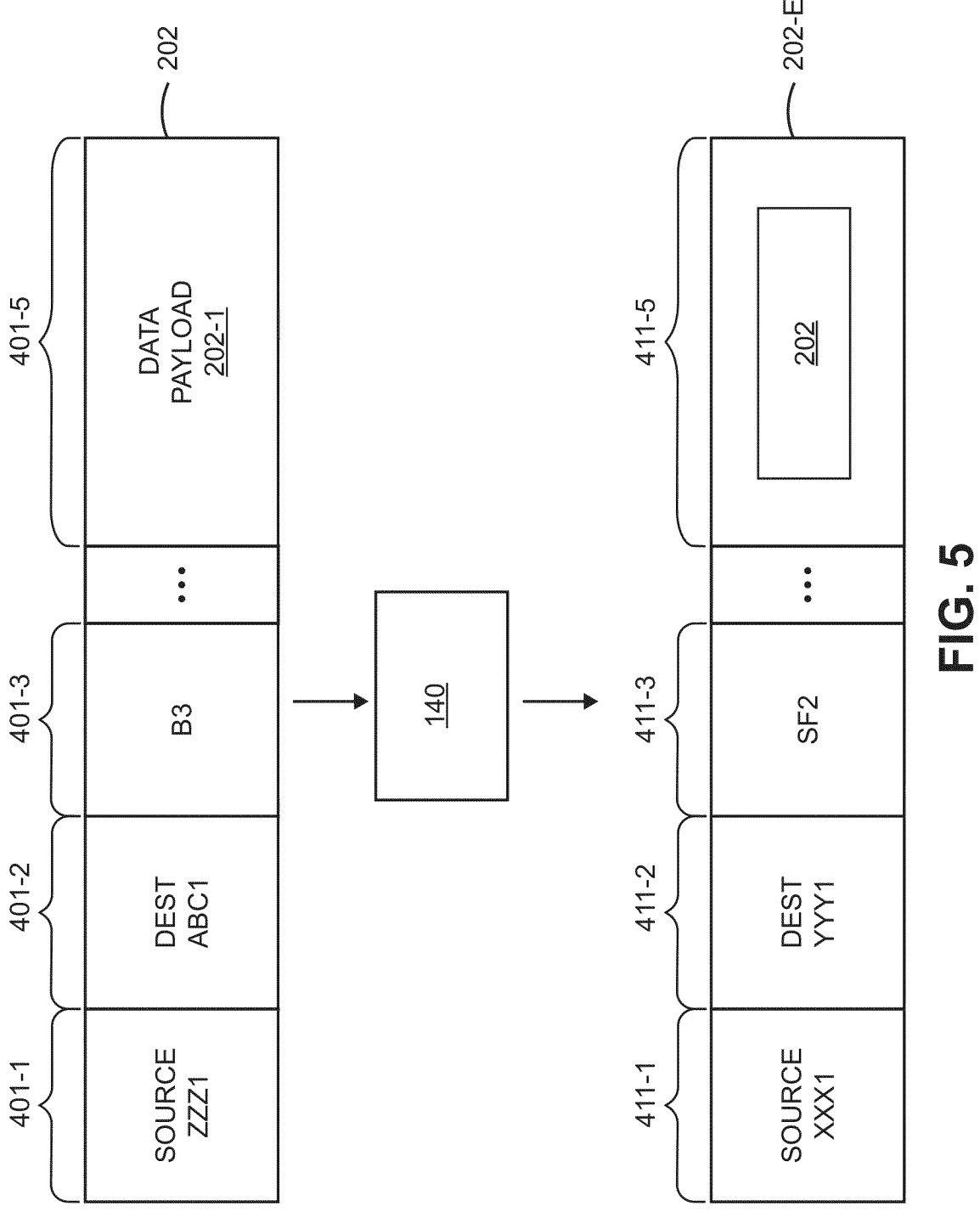
FIG. 5 is an example diagram illustrating conversion of a respective second data packet encoded in accordance with a wireless communication protocol into a second encapsulated data packet for conveyance over a second service flow of a backhaul network as discussed herein.

FIG. 5 is an example diagram illustrating conversion of a respective second data packet encoded in accordance with a wireless communication protocol into a second encapsulated data packet for conveyance over a second service flow of a backhaul network as discussed herein.

In this example, the communications 202 conveyed from the mobile communication device 111 over the wireless communication link 127-1 to the wireless base station 131 include: i) a source network address of ZZZ1 in data field 401-1, ii) destination network address of ABC1 in data field 401-2, iii) tag value of B3 in data field 401-3, . . . , and iv) data payload of 202-1 in data field 401-5.

Note that the data fields 401-1, 401-2, and 401-3 are present in a respective header of the communications 202 (such as a data packet).

The source network address of ZZZ1 in data field 401-1 indicates the identity of the mobile communication device 111 transmitting the communications 202. The destination network address of ABC1 indicates an identity of a communication device 113 to which the communications 202 are being transmitted for delivery. The tag value B3 in data field

401-3 indicates a corresponding type of quality of service in which to forward the communications 202 to the target communication device 113.

As further shown, the communication management resource 140 utilizes the map information 150 as a basis in which to prepare (convert) the communications 202 for transmission over the network 195.

For example, the communication management resource 140 receives communications 202 (such as a data packet) including a data payload 202-1. In one example, the communications 202 are encoded in accordance with a wireless communication protocol for conveyance to a destination network address ABC1 as previously discussed. The communication management resource 140 uses the map information 150 to determine a corresponding service flow in which to convey the received communications 202. This can include the communication management resource 140 retrieving the tag value B3 from the data field 401-3 of the communications 202 and, via the map information 150, detecting that the tag value B3 corresponds to the service flow SF2 and the queue Q12. In such an instance, the communication management resource 140 maps a second quality of service as indicated by the tag value B3 to the service flow SF2 amongst multiple service flows (SF1, SF2, SF3, SFx) supported by the network 195 such as a backhaul communication system.

As further shown, the communication management resource 140 populates the data field 411-1 of the encapsulated communication 202-E to include a source network address of XXX1 (unique identifier value) assigned to the communication management node 161; the communication management resource 140 populates the data field 411-2 of the encapsulated communications 202-E to include a destination network address of YYY1 assigned to the communication management node 162; the communication management resource 140 stores flow control information such as one or more of tag value SF2 indicating the service flow SF2, tag value B3, etc., in the data field 411-3; the communication management resource 140 stores the original communications 202 in the data field 411-5 of the communications 202-E.

The communication management resource 140 then stores the encapsulated communications 202-E in the identified queue Q12 for subsequent delivery over the service flow SF2.

Figure 6:
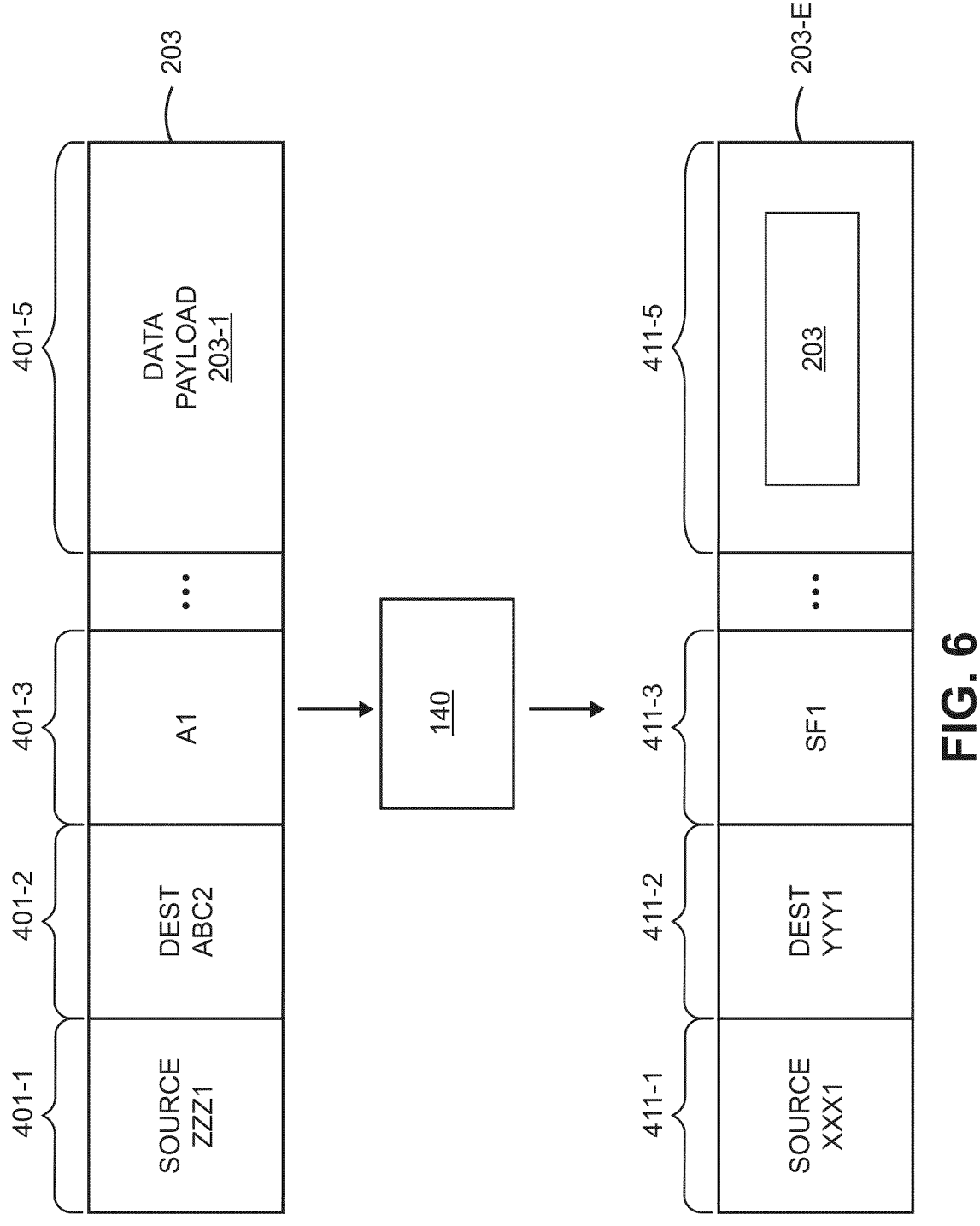
FIG. 6 is an example diagram illustrating conversion of a respective third data packet encoded in accordance with a wireless communication protocol into a third encapsulated data packet for conveyance over a service flow of a backhaul network as discussed herein.

FIG. 6 is an example diagram illustrating conversion of a respective third data packet encoded in accordance with a wireless communication protocol into a third encapsulated data packet for conveyance over a third service flow of a backhaul network as discussed herein.

In this example, the communications 203 conveyed from the mobile communication device 111 over the wireless communication link 127-1 to the wireless base station 131 include: i) a source network address of ZZZ1 in data field 401-1, ii) destination network address of ABC2 in data field 401-2, iii) tag value of A1 in data field 401-3, . . . , and iv) data payload of 203-1 in data field 401-5.

Note that the data fields 401-1, 401-2, and 401-3 are present in a respective header of the communications 203 (such as a data packet).

The source network address of ZZZ1 in data field 401-1 indicates the identity of the mobile communication device 111 transmitting the communications 203. The destination network address of ABC2 indicates an identity of a communication device 114 to which the communications 203 are being transmitted for delivery. The tag value A1 in data field

401-3 indicates a corresponding type of quality of service in which to forward the communications 203 to the target communication device 114.

As further shown, the communication management resource 140 utilizes the map information 150 as a basis in which to prepare (convert) the communications 203 for transmission over the network 195.

For example, the communication management resource 140 receives communications 203 (such as a data packet) including a data payload 203-1. In one example, the communications 203 are encoded in accordance with a wireless communication protocol for conveyance to a destination network address ABC2 as previously discussed. The communication management resource 140 uses the map information 150 to determine a corresponding service flow in which to convey the received communications 203. This can include the communication management resource 140 retrieving the tag value A1 from the data field 401-3 of the communications 203 and, via the map information 150, detecting that the tag value A1 corresponds to the service flow SF1 and the queue Q11. In such an instance, the communication management resource 140 maps a quality of service as indicated by the tag value A1 to the service flow SF1 amongst multiple service flows (SF1, SF2, SF3, SFx) supported by the network 195 such as a backhaul communication system.

As further shown, the communication management resource 140 populates the data field 411-1 of the encapsulated communication 203-E to include a source network address of XXX1 (unique identifier value) assigned to the communication management node 161; the communication management resource 140 populates the data field 411-2 of the encapsulated communications 203-E to include a destination network address of YYY1 assigned to the communication management node 162; the communication management resource 140 stores flow control information such as one or more of tag value SF1 indicating the service flow SF1, tag value A1, etc., in the data field 411-3; the communication management resource 140 stores the original communications 203 in the data field 411-5 of the communications 203-E.

The communication management resource 140 then stores the encapsulated communications 203-E in the identified queue Q11 for subsequent delivery over the service flow SF1.

Figure 7:
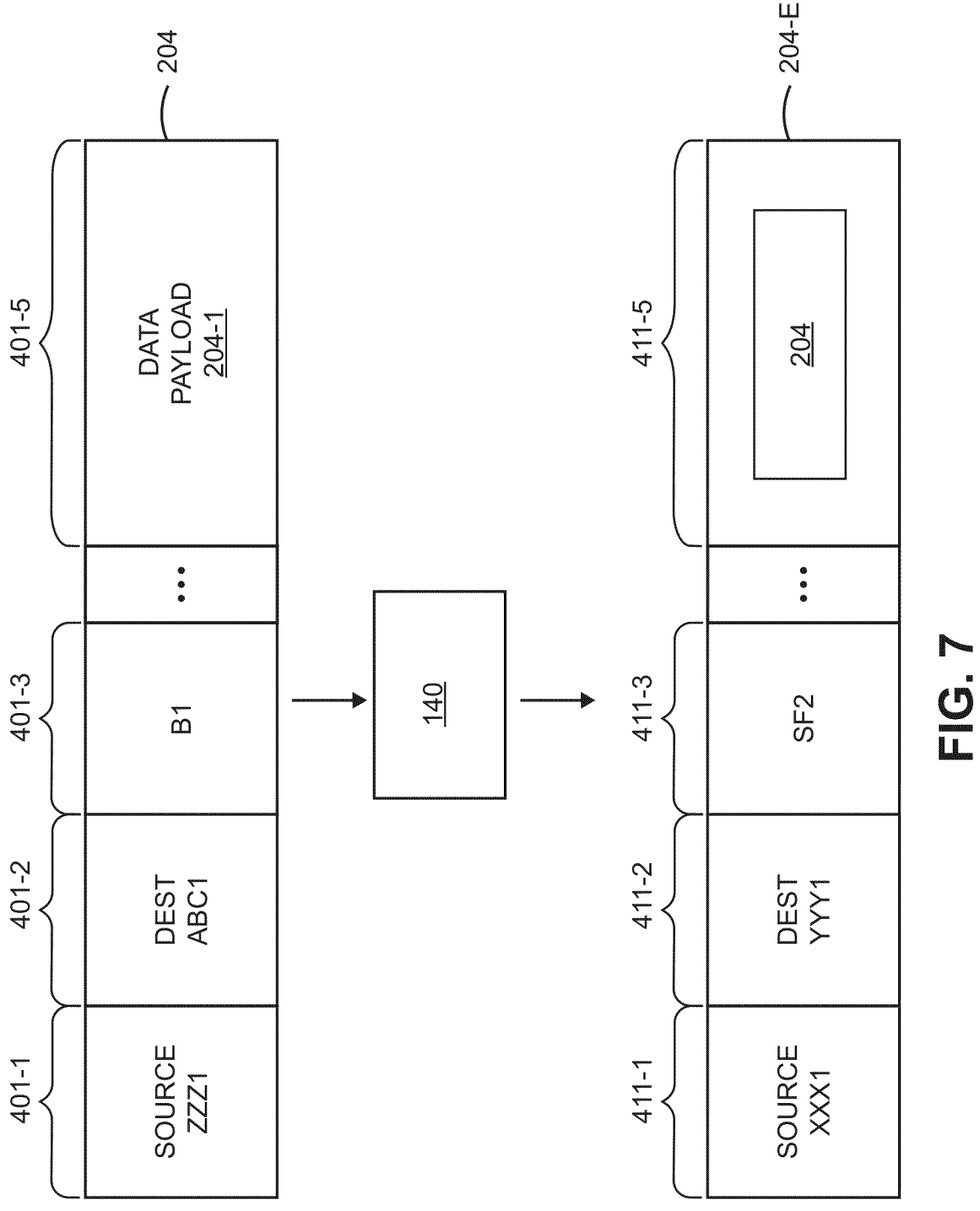
FIG. 7 is an example diagram illustrating conversion of a respective fourth data packet encoded in accordance with a wireless communication protocol into a fourth encapsulated data packet for conveyance over a service flow of a backhaul network as discussed herein.

FIG. 7 is an example diagram illustrating conversion of a respective fourth data packet encoded in accordance with a wireless communication protocol into a fourth encapsulated data packet for conveyance over a fourth service flow of a backhaul network as discussed herein.

In this example, the communications 204 conveyed from the mobile communication device 111 over the wireless communication link 127-1 to the wireless base station 131 include: i) a source network address of ZZZ1 in data field 401-1, ii) destination network address of ABC1 in data field 401-2, iii) tag value of B1 in data field 401-3, . . . , and iv) data payload of 204-1 in data field 401-5.

Note that the data fields 401-1, 401-2, and 401-3 are present in a respective header of the communications 204 (such as a data packet).

The source network address of ZZZ1 in data field 401-1 indicates the identity of the mobile communication device 111 transmitting the communications 204. The destination network address of ABC1 indicates an identity of a communication device 113 to which the communications 204 are being transmitted for delivery. The tag value B1 in data field

401-3 indicates a corresponding type of quality of service in which to forward the communications 204 to the target communication device 113.

As further shown, the communication management resource 140 utilizes the map information 150 as a basis in which to prepare (convert) the communications 204 for transmission over the network 195.

For example, the communication management resource 140 receives communications 204 (such as a data packet) including a data payload 204-1. In one example, the communications 204 are encoded in accordance with a wireless communication protocol for conveyance to a destination network address ABC1 as previously discussed. The communication management resource 140 uses the map information 150 to determine a corresponding service flow in which to convey the received communications 204. This can include the communication management resource 140 retrieving the tag value B1 from the data field 401-3 of the communications 204 and, via the map information 150, detecting that the tag value B1 corresponds to the service flow SF2 and the queue Q12. In such an instance, the communication management resource 140 maps a quality of service as indicated by the tag value B1 to the service flow SF2 amongst multiple service flows (SF1, SF2, SF3, SFx) supported by the network 195 such as a backhaul communication system.

As further shown, the communication management resource 140 populates the data field 411-1 of the encapsulated communication 204-E to include a source network address of XXX1 (unique identifier value) assigned to the communication management node 161; the communication management resource 140 populates the data field 411-2 of the encapsulated communications 204-E to include a destination network address of YYY1 assigned to the communication management node 162; the communication management resource 140 stores flow control information such as one or more of tag value SF2 indicating the service flow SF2, tag value B1, etc., in the data field 411-3; the communication management resource 140 stores the original communications 204 in the data field 411-5 of the communications 204-E.

The communication management resource 140 then stores the encapsulated communications 204-E in the identified queue Q11 for subsequent delivery over the service flow SF2.

Referring again to FIG. 1, the communication management resource 140 uses the forwarding control information 107 as a basis to transmit the encapsulated communications in the different queues over the respective service flows of the network 195.

As previously discussed, the communication management resource 140 stores the encapsulated communications 201-E and communications 203-E in the queue Q11 for delivery over the service flow SF1 to the communication node 162. The communication management resource 140 stores the encapsulated communications 203-E and 204-E in the queue Q12 for subsequent delivery over the service flow SF2 to the communication node 162.

As previously discussed, the multiple service flows in the network 195 support conveyance of different types of data traffic between a cable modem such as communication management node 161 of the cable modem system and a cable modem termination node such as communication management node 162 of a cable modem system.

The bypass service flow SF1 supports a first quality of service of conveying data over the network 195; the bypass service flow SF2 supports a second quality of service conveying data over the network 195; the bypass service flow SF3 supports a third quality of service of conveying data over the network 195; so on.

In accordance with the forwarding control information 107, the communication management resource 140 transmits the encapsulated communications 201-E and communications 203-E over the service flow SF1 to the communication management node 162; the communication management resource 140 transmits the encapsulated communications 202-E in communications 204-E over the service flow SF2 to the communication management node 162; and so on.

As further shown in FIG. 1, the communication management node 162 can be configured to process each of the received encapsulated communications to retrieve the original communications for forwarding to the respective destination.

For example, the communication management resource 141 associated with the communication management node 162 receives the encapsulated communications 201-E. The communication management node 162 includes the queue Q21 to store packets received over the service flow SF1.

In this example, the communication management resource 141 obtains the original communications 201 from the encapsulated communications 201-E and stores the retrieved original communications 201 in the queue Q21 for subsequent forwarding over the network 190 to the target destination ABC2 (communication device 114).

The communication management resource 141 obtains the original communications 203 from the encapsulated communications 203-E and stores the retrieved original communications 203 in the queue Q21 for subsequent forwarding over the network 190 to the target destination ABC2 (communication device 114). Thus, the communication management resource 141 can be configured to store any data packets received over the service flow SF1 in the corresponding queue Q21.

In a similar manner, the communication management resource 141 obtains the original communications 202 from the encapsulated communications 202-E and stores the retrieved original communications 202 in the queue Q22 for subsequent forwarding over the network 190 to the target destination ABC1 (communication device 113).

The communication management resource 141 obtains the original communications 204 from the encapsulated communications 204-E and stores the retrieved original communications 204 in the queue Q22 for subsequent forwarding over the network 190 to the target destination ABC1 (communication device 113).

Thus, the communication management resource 141 can be configured to store any data packets received over the service flow SF2 in the corresponding queue Q22.

In one example, the communication management resource 141 forwards the communications in the queues over the network 190 in accordance with the forwarding control information 108.

Note that each of the service flows supported by the communication system including the communication node 161, network 195, and the communication management node 162 can be configured to support bidirectional conveyance of data. For example, in a reverse direction, the communication management resource 141 associated with the communication management node 162 can be configured to receive data packets from each of the communication devices 113 and 114 over network 190. In one example, the network 190 supports conveyance of 5G (wireless) communications (such as data packets encoded in accordance with a wireless communication protocol) received from the communication devices 113 and 114.

The communication management resource 141 converts the received data packets (188) into encapsulated data packets (189) for transmission over a respective service flow depending upon the type of data being transmitted. The communication management resource 141 can be configured to store the encapsulated communications in a respective queues for subsequent delivery from the communication management node 162 over the network 195 to the communication management node 161. The communication management node 161 further converts the encapsulated data packets to their original form for forwarding to the wireless base station 131. The wireless base station 131 wirelessly transmit the data packets to the appropriate destinations over the wireless communication link 127-1, wireless vacation link 127-2, etc., such as mobile communication device 111.

Figure 8:
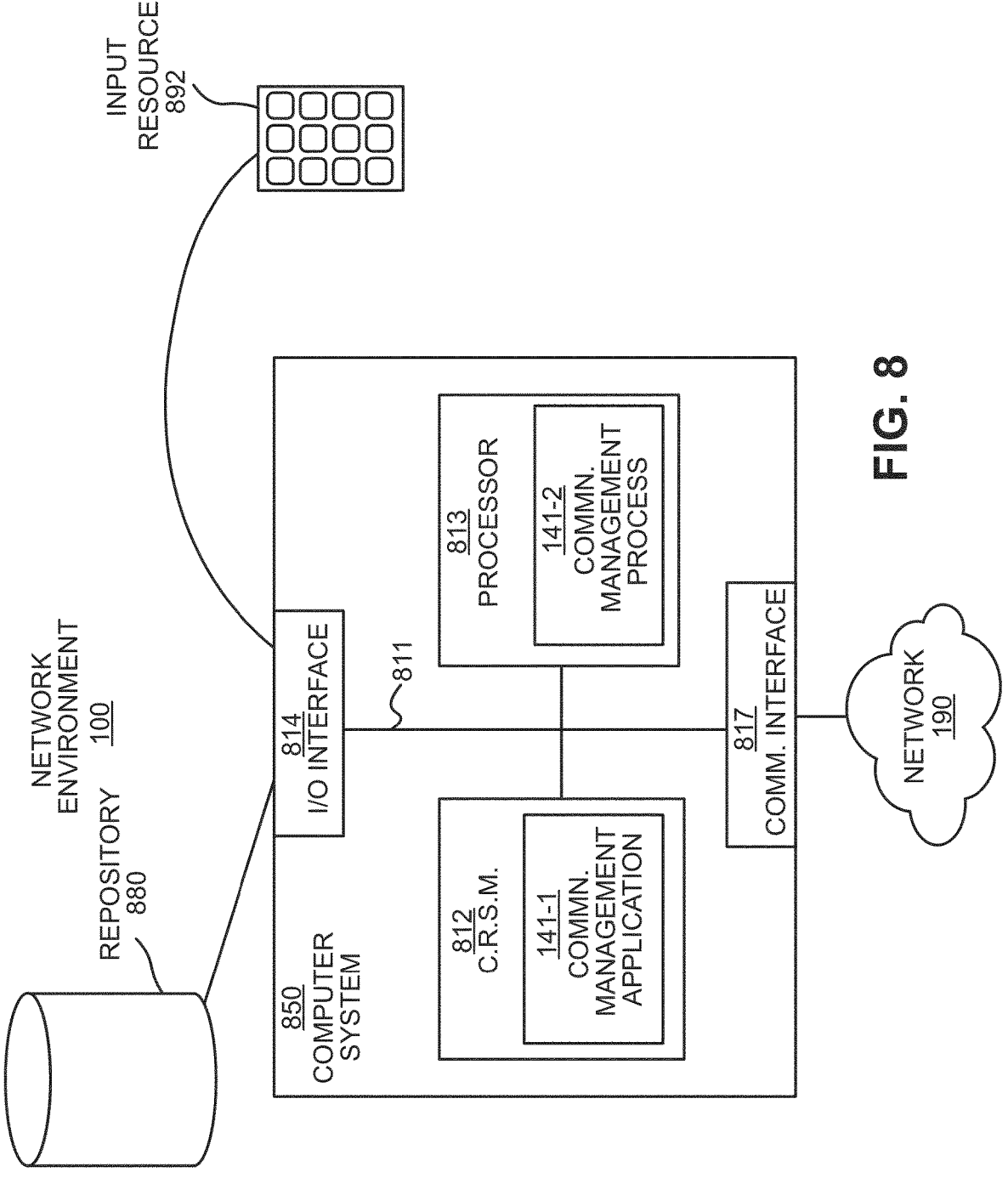
FIG. 8 is an example diagram illustrating example computer hardware and software operable to execute operations as discussed herein.

FIG. 8 is an example block diagram of a computer system for implementing any of the operations as previously discussed according to examples herein.

Note that any of the resources (such as wireless base station 131, mobile communication device 111, communication management resource 140, communication management resource 141, communication device 113, communication device 114, communication management node 161, communication management node 162, etc.) as discussed herein can be configured to include computer processor hardware and/or corresponding executable instructions to carry out the different operations as discussed herein.

For example, as shown, computer system 850 of the present example includes interconnect 811 coupling computer readable storage media 812 such as a non-transitory type of media or computer readable storage hardware (which can be any suitable type of resource in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one example, the computer readable storage medium 812 stores instructions and/or data.

As shown, computer readable storage media 812 can be encoded with communication management application 140-1 in a respective one or more network nodes to carry out any of the operations as discussed herein.

During operation of one example, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute the management application 140-1.

In accordance with different examples, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart 900 in FIG. 9. Note that the steps in the flowcharts below can be executed in any suitable order.

FIG. 9 is a flowchart 900 illustrating an example method according to examples herein. Note that there will be some overlap with respect to concepts as discussed above.

In processing operation 910, the communication management resource 140 receives a data packet including a data payload. The data packet is encoded in accordance with a wireless communication protocol (such as 5G or other wireless communication protocol) for conveyance to a destination network address.

In processing operation 920, the communication management resource 140 maps a first quality of service associated with the data packet to a first service flow amongst multiple service flows supported by a backhaul network.

In sub-processing operation 930 associated with the processing operation 920, the communication management resource 140 retrieves a tag value from a header of the received data packet.

In sub-processing operation 940 associated with the processing operation 920, the communication management resource 140 detects that the retrieved tag value is assigned to the first service flow amongst the multiple service flows.

In processing operation 950, the communication management resource 140 selects a queue in which to store the first data packet based on the tag value. The selected queue is assigned to the first service flow and being one of multiple queues associated with the backhaul network.

In processing operation 960, the communication management resource 140 stores the data packet (encapsulated or not) in the selected queue.

In processing operation 970, the communication management resource 140 forwards the data packet (such as encapsulated) from the selected queue over the first service flow of the backhaul network for delivery of the first data packet to the destination network address.

Note again that techniques herein are well suited to facilitate support of wireless services over a backhaul such as a cable modem termination system. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this example has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

We claim:

1. A method comprising:
  receiving a first data packet including a first data payload, the first data packet encoded in accordance with a wireless communication protocol for conveyance to a destination network address;
  mapping a first quality of service associated with the first data packet to a first service flow amongst multiple service flows supported by a backhaul network; and
  forwarding the first data packet over the first service flow of the backhaul network for delivery of the first data packet to the destination network address.

2. The method as in claim 1, wherein the backhaul network includes a cable modem system.

3. The method as in claim 2, wherein the multiple service flows support conveyance of different types of data traffic between a cable modem of the cable modem system and a cable modem termination node of the cable modem system.

4. The method as in claim 1, wherein the first quality of service is one of multiple qualities of service supported by the wireless communication protocol.

5. The method as in claim 1, wherein mapping the first quality of service associated with the first data packet to the first service flow amongst multiple service flows supported by the backhaul network includes:
  retrieving a tag value from the first data packet, the tag value indicating the first quality of service to which the first data packet pertains.

6. The method as in claim 5, wherein mapping the first quality of service associated with the first data packet to the first service flow amongst multiple service flows supported by the backhaul network further includes:
  in response to detecting that the first quality of service as specified by the tag value is included in a first group of multiple different qualities of service assigned to the first service flow, assigning the first data packet for transmission over the first service flow.

7. The method as in claim 1, wherein forwarding the first data packet over the first service flow includes:
  selecting a queue in which to store the first data packet, the selected queue being one of multiple queues associated with the backhaul network; and
  storing the first data packet in the selected queue, the selected queue configured to store data packets assigned multiple different qualities of service including the first quality of service.

8. The method as in claim 7, wherein the selected queue is selected from a group consisting of:
  i) a first bit rate service flow queue providing a first transmission bit rate greater than a minimum bit rate value, the first transmission bit rate being guaranteed,
  ii) a second bit rate service flow queue providing a second transmission bit rate, the second transmission bit rate being non-guaranteed, and
  iii) a third bit rate service flow queue supporting latency below a latency threshold level.

9. The method as in claim 1 further comprising:
  retrieving a tag value from the first data packet to determine that the first data packet is assigned the first quality of service, the tag value indicating how to allocate network resources to convey the first data packet over the backhaul network.

10. The method as in claim 1, wherein mapping the first quality of service associated with the first data packet to the first service flow amongst multiple service flows supported by the backhaul network includes:
  retrieving a tag value from a header of the first data packet; and
  detecting that the retrieved tag value is assigned to the first service flow of the multiple service flows.

11. A system comprising:
  communication management hardware including computer processor hardware operative to:
    receive a first data packet including a first data payload, the first data packet encoded in accordance with a wireless communication protocol for conveyance to a destination network address, the first data packet assigned a first quality of service;
    map the first quality of service assigned to the first data packet to a first service flow amongst multiple service flows supported by a backhaul network; and
    forward the first data packet over the first service flow of the backhaul network for delivery of the first data packet to the destination network address.

12. The system as in claim 11, wherein the computer processor hardware is further operative to:
  retrieve a tag value from the first data packet, the tag value indicating assignment of the first quality of service to the first data packet.

13. The system as in claim 12, wherein the computer processor hardware is further operative to:
  in response to detecting that the first quality of service as specified by the tag value is included in a first group of multiple qualities of service assigned to the first service flow, assigning the first data packet for transmission over the first service flow of the backhaul network.

14. The system as in claim 11, wherein the computer processor hardware is further operative to:

retrieve a tag value from the first data packet to determine that the first quality of service is assigned to the first data packet, the tag value indicating how to allocate network resources in the backhaul network to convey the first data packet over the backhaul network.

15. The system as in claim 11, wherein the computer processor hardware is further operative to:

retrieve a tag value from a header of the first data packet; and detect that the retrieved tag value is assigned to the first service flow amongst the multiple service flows.

16. Computer-readable storage hardware having instructions stored thereon, the instructions, when carried out by computer processor hardware, cause the computer processor hardware to:

receive a first data packet including a first data payload, the first data packet encoded in accordance with a wireless communication protocol for conveyance to a destination network address;

map a first quality of service associated with the first data packet to a first service flow amongst multiple service flows supported by a backhaul network, the first quality of service being one of multiple qualities of service assigned to the first service flow; and forward the first data packet over the first service flow of the backhaul network for delivery of the first data packet to the destination network address.

17. The method as in claim 1, wherein mapping the first quality of service associated with the first data packet to the first service flow includes:

retrieving a first tag value from the first data packet, the first tag value indicating that the first quality of service is assigned to the first data packet;

using map information, mapping the first tag value to a first service flow identifier value, the first service flow identifier value indicating the first service flow.

18. The method as in claim 17 further comprising:

producing a first communication to include the first data packet and the first service flow identifier value; and wherein forwarding the first data packet over the first service flow includes: transmitting the first communication over the first service flow of the backhaul network for delivery of the first data packet to the destination network address.

19. The method as in claim 18, wherein the first communication is a first encapsulated message including the first data packet and the first service flow identifier value; and wherein forwarding the first data packet over the first service flow includes: via the first service flow identifier value in the first encapsulated message, conveying the first encapsulated message over the first service flow of the backhaul network.

20. The method as in claim 19 further comprising:

receiving a second data packet including a second data payload, the second data packet encoded in accordance with the wireless communication protocol for conveyance to the destination network address;

retrieving a second tag value from the second data packet, the second tag value indicating a second quality of service assigned to the second data packet, the second quality of service different than the first quality of service; and using map information, mapping the second tag value to the first service flow identifier value.

21. The method as in claim 20 further comprising:

producing a second communication to include the second data packet and the first service flow identifier value; and transmitting the second communication over the first service flow of the backhaul network for delivery of the second data packet to the destination network address.

22. The method as in claim 21, wherein the second communication is a second encapsulated message including the second data packet and the first service flow identifier value;

wherein forwarding the second data packet over the first service flow includes: via the first service flow identifier value in the second encapsulated message, conveying the second encapsulated message over the first service flow of the backhaul network.

23. The method as in claim 22, wherein the first service flow conveys both the first encapsulated message and the second encapsulated message over the first service flow of the backhaul network in accordance with a same backhaul quality of service assigned to the first service flow.

24. The method as in claim 1, wherein the first quality of service is one of multiple qualities of service assigned to the first service flow in the backhaul network, the multiple qualities of service assigned to the first service flow including the first quality of service and a second quality of service; and wherein the second quality of service is assigned a lower packet delay budget than the first quality of service.

25. The method as in claim 24 further comprising:

receiving a second data packet including a second data payload, the second data packet encoded in accordance with the wireless communication protocol;

using map information, mapping the second quality of service associated with the second data packet to the first service flow; and transmitting the second data packet over the first service flow of the backhaul network for delivery of the second data packet to the destination; and wherein the first service flow provides a same backhaul quality of service associated with conveyance of the first data packet and the second data packet over the backhaul network.

26. The method as in claim 25, wherein forwarding the first data packet over the first service flow includes storing the first data packet in a first queue supporting the first quality of service and the second quality of service; and wherein transmitting the second data packet over the first service flow includes storing the second data packet in the first queue.

* * * * *